Nov. 6, 1962   Z. J. JAGIEL   3,061,903
TUBE CLAMP
Filed May 2, 1960   2 Sheets-Sheet 1
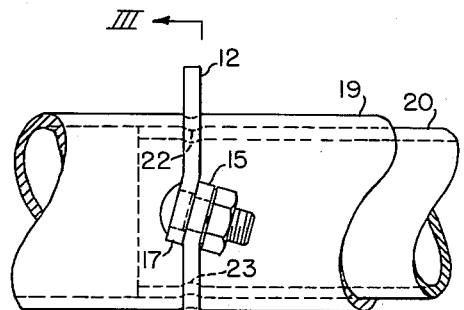
Fig. I
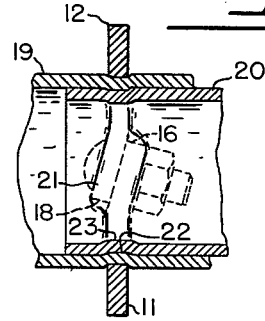
Fig. II
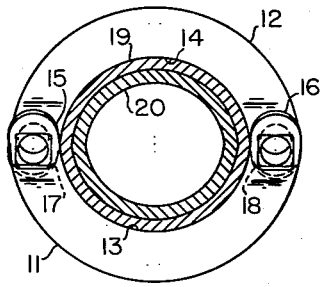
Fig. III
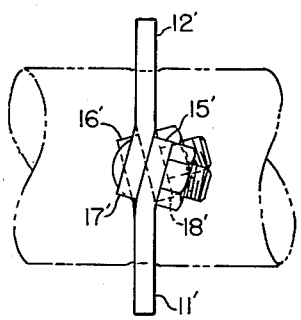
Fig. V
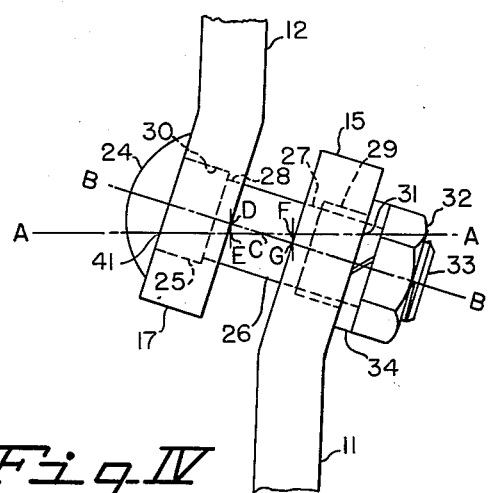
Fig. IV
INVENTOR.
ZIGMUND JOSEPH JAGIEL
BY
Marshall + Wilson
ATTORNEYS Nov. 6, 1962    Z. J. JAGIEL    3,061,903
TUBE CLAMP
Filed May 2, 1960    2 Sheets-Sheet 2
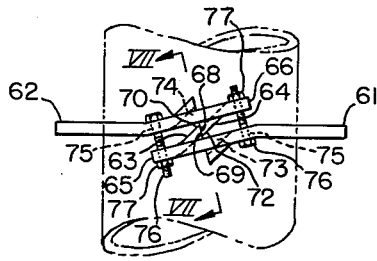
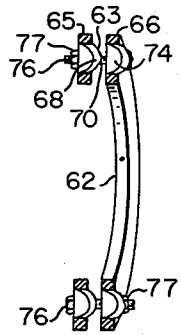
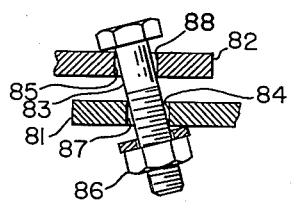
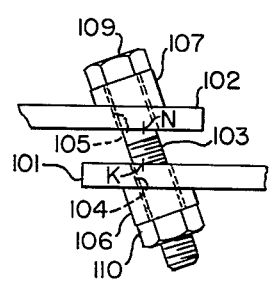
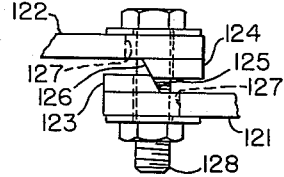
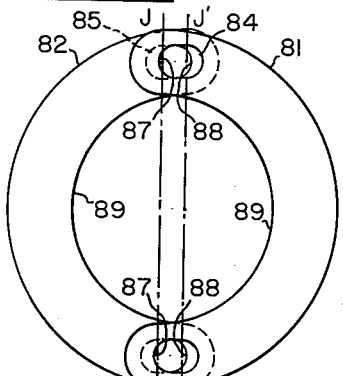
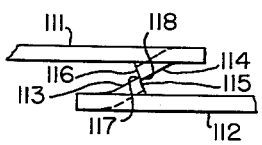
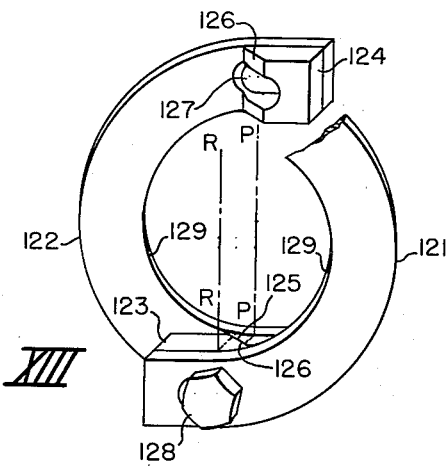
INVENTOR.
ZIGMUND JOSEPH JAGIEL
BY
*Marshall + Wilson*
ATTORNEYS United States Patent Office
3,061,903
Patented Nov. 6, 1962

3,061,903
TUBE CLAMP
Zigmund Joseph Jagiel, 3106 Algonquin Parkway, Toledo, Ohio
Filed May 2, 1960, Ser. No. 26,243
7 Claims. (Cl. 24—268)

This invention relates to tube clamps and more particularly to clamps adapted to apply pressure radially inward on the walls of an embraced tube.

It is frequently desirable to clamp a tube and impose pressure thereon over one or more lines which are closed upon themselves in order to seal that tube to a member of a configuration conforming generally to its internal surface and thereby prevent the escape of fluids being transmitted through the tube at its junction with the member over which it is telescoped. A number of forms of clamps seeking to afford this type of action have been proposed in the past. The major difficulty in obtaining a complete seal arises in the area that the clamp is split to enable it to be placed around the tube. Efforts in the past to develop suitable pressures at these junction regions have usually involved somewhat complex structures wherein overlapping paired lines of pressure are applied in an effort to generally embrace the lines of pressure developed from the opposite side of the tube clamp by the cooperating clamping elements. One such form of clamp utilizes a U-bolt embracing 180° of a right circular, tubular element cooperating with a saddle which is of channel form and has a semi-circular cutout in each side wall which offers a double line of pressure under the edges bounding those areas. This saddle-U-bolt construction frequently is modified in order to further supplement the pressures imposed on the tube walls in the region of the junction of their respective contact areas.

An object of the present invention is to improve tube clamps offering the means to impose pressure over a closed path encircling the tube and thereby providing a complete seal for telescoped tubes. Another object is to simplify the structure and the mechanical manipulation necessary in mounting a sealing tube clamp. A further object is to reduce the cost of a sealing tube clamp by simplifying and reducing the forming and cutting processes required in its manufacture and by reducing the amount of material required.

The above objects are realized in accordance with this invention by a tube clamp comprising a pair of plates having cutout regions which conform in their combined shape and size to the cross section of the tube to be clamped, for example, where a tube with a circular cross section is to be clamped, semi-circular cutout regions can be provided in the plates such that the edges of the regions closely conform to the outer surface of the tube. The plates are provided with extensions beyond the cutout regions conforming to the tube outer surface such that they can be mounted on opposite sides of the tube with the extensions in overlapping relationship and spaced from each other along the axis of the tube. The spaced opposed plate members are mechanically coupled through inclined surfaces which guide their movement toward each other. Those surfaces are inclined with respect to the longitudinal axis of the tube so that the movement of the two members with respect to each other along the paths defined by those surfaces induces a component of movement transverse to the axis of the tube and along the major faces of the plates toward each other. Means are provided, such as a bolt, to draw the two plate members toward each other and cause the edges of the cutout regions conforming to the tube to be drawn toward each other due to the transverse component of force developed through the inclined coupling surfaces. When the engaged coupling surfaces initially fit the tube snugly, this additional force imposed on the tube effects a sealing operation by imposing a pressure upon the tube wall in the direction of movement of the members toward each other. Since a close-fitting overlap at the juncture of the contact lines of the two members with the tube is effected in this construction, the imposition of pressures to the surfaces in quadrature relation to those surfaces tend to urge the tube outward toward those embracing edges. The confinement by those edges of that outward motion and the resulting relative movement between the elements imposes pressure over those side regions.

The component of force tending to draw the cutout regions toward each other and impose the pressure of the edges of those regions on the tube is generated through guiding surfaces on the opposed plates which when viewed from the tube conforming cutout region of the respective plate defines an obtuse angle with the face of the plate which is juxtaposed to the opposite plate element. Several forms of the guiding means can be employed as will be set forth in more detail below.

The ultimate position of the plate elements on opposite sides of the tube member when it is fully clamped are such that the ends of those elements overlap. In one embodiment of the invention, this overlapping results in the main portions of the plate elements being offset with respect to each other along the longitudinal axis of the tube. In a second embodiment, the overlapping portions of the plate elements are bent out of the plane of the plates along inclined faces which, when mounted in opposition, match whereby the major body portions of the plate elements are virtually in alignment with each other on the tube cross section.

The above and other objects and features of this invention will be appreciated more fully from the following detailed description when read with reference to the accompanying drawings in which:

FIG. I is a side view of one embodiment of the invention as applied in clamping position to a tube which has been joined to a second tube by a telescoped coupling;

FIG. II is a sectioned view of FIG. I taken along the axis of the tubes;

FIG. III is a cross-sectional view of FIG. I taken along the lines III—III;

FIG. IV is an enlarged view of the portion of the overlapping plate element which provides the relative movement creating the sealing pressures;

FIG. V is a side view of another embodiment of a sealing clamp according to this invention wherein the inclined overlapping faces are offset in opposite directions on opposite sides of each plate member;

FIG. VI is a side view of another form of clamping mechanism of this invention;

FIG. VII is a cross-sectional view of FIG. VI taken along the line VII—VII;

FIGS. VIII, X, XI and XII are fragmentary side views of other embodiments of the clamp showing the details of the overlapping portions of the plate members which develop the sealing forces;

FIG. IX is a plan view of the clamp of FIG. VIII; and

FIG. XIII is a perspective of the clamp of FIG. XII.

Each of the several clamp constructions to be discussed effect clamping action by moving plates positioned on opposite sides of a tube toward each other and along their major faces. Where a seal is to be formed by the clamp the edges of those faces effect some distortion of the tube wall in the region they contact that wall. Accordingly, the mechanical properties of the clamping plates must be sufficient to transmit the forces developed in drawing the plate members together to the tube without loss of the form which enables the clamping forces to be generated. Thus, the character of the clamping plates and the elements which draw those plates together will vary with the type of tubing to be clamped. A readily yieldable tube such as a rubber hose which is to be sealed on a rigid ferrule requires only relatively lightweight clamping elements since the forces required to be applied to the tubing to distort it against the ferrule are small. On the other hand a clamp to be applied to 16 to 18 gauge steel tubing can advantageously have its plate elements constructed of steel plate of the order of one-eighth of an inch thickness. In view of these variations of structural requirements with the intended use of the clamps, the following discussion will not specify the material to be utilized for the clamp elements nor the dimensions of those elements, it being understood that the elements should be constructed as economically as is consistent with sound engineering practice for the patent application.

As shown in FIGS. I, II and III, the clamp of this invention comprises a pair of plates 11 and 12, each of which has a cutout region defining edges 13 and 14 which conform to the outer surface of the tube upon which they are to be mounted. For purposes of convenience the present discussion will be confined to examples utilizing circular tubes. However, it is to be understood that tube forms departing from a circular cross section might also be accommodated in a clamp of the type under consideration by appropriate alteration in the form of the cutout regions 13 and 14. Each of the edges 13 and 14 conforms to one-half of the periphery of the cross section of the tube being embraced and then extend beyond that cross section and tangent thereto as shown at the ends 15, 16, 17 and 18. The clamp as illustrated in FIGS. I, II and III is in a position to seal the tube 19 telescoped over tube 20 to tube 20 along the area 22 of concentrated pressure beneath the edges 13 and 14. Thus as shown by the invisible lines in FIG. I the wall of tube 19 is distorted along the line 22 into tight-fitting engagement with the wall of tube 20 and that distortion is even conveyed into the wall of tube 20 at 23.

The sealing pressure is created by advancing the plate elements 11 and 12 toward each other along their overlapping portions 15, 16, 17 and 18 to impose pressures on the surfaces encountered by the edges 13 and 14 and further to tend to flatten the tubular cross section to an oval form wherein the major axis of the oval extends outward in the region in the overlapping elements 15, 16, 17 and 18 and by virtue of the confinement of those elements, the tube walls therebeneath are also distorted to form a continuous line of sealing as in the region 21 disclosed best in the sectional view of FIG. II.

The advancement of the edges 13 and 14 of plate elements 11 and 12 toward each other is accomplished by drawing the juxtaposed faces of the plate elements toward each other generally along the axis of the tube while guiding the movement of the plate elements with respect to each other along a pair of guide members on opposite sides of the tube in the region of the overlap of the plates which confines the relative movement of those elements to paths which are inclined with respect to the axis of the tube in planes parallel to that axis. The inclination of this guiding path is such that it provides a component of motion of each plate element toward the opposed plate element and transverse of the tube axis when the elements are moved toward each other along the axis by virtue of their action confining the elements to movement along a path defining an obtuse angle with the juxtaposed faces of the plates when viewed from the tube contacting edges 13 and 14 of the plates.

The means for accomplishing this guiding and for advancing the elements 12 and 13 toward each other will best be understood by reference to FIG. IV showing the cooperative relationship of these elements in enlarged fragmentary form. The axes of the tubes are represented by the dot and dash line AA. The offset regions include the ends 15 and 17 and a portion of the plate members 11 and 12. The semicircular edges 13 and 14 as limited by a diameter extending across the cutout in each plate extend to the intersection of the projection of tube axis A—A and the more remote faces of the opposed plates 11 and 12 as at 31 and 41 so that the plate members can be mounted on opposite sides of the tube with the overlapping relationship shown in FIG. IV. These edges should be so spaced when their guides are coupled prior to tightening the clamp that they conform to the tube cross section and when the clamp plates are brought together they should distort that cross section to effect a seal. Therefore, the center of the bolt which is employed to draw the plates together is juxtaposed the semi-circular edge and displaced from the projection of the diameter defining the limits of that edge on the portion of the plate bearing that edge. This center is defined by the line B—B.

The ends 15 and 17, including a portion of this semicircular edge and a portion of the edge tangential to the limits of the semi-circular edge beyond the limiting diameters of the respective semi-circles, are bent out of the major surfaces in which the body portions of plates 11 and 12 lie. Apertures are provided in those offset ends through which a bolt 24 projects. The apertures are oriented such that the bolt is maintained on an inclination generally normal to the end portions 15 and 17. They are formed with circular portions 27 and 28 and squared portions 29 and 30 which are arranged to receive the squared portion 25 of the shank when a carriage bolt is employed such that the bolt will not turn as the nut 32 is tightened on its threaded end 33.

With the arrangement illustrated when the edges 13 and 14 are mounted snugly against the outer tube walls and the ends 15 and 17 are spaced as shown in FIG. IV, the limiting diameters of the semi-circular edges 13 and 14 perpendicular to the paper run through the points 31 and 41 and the axes of the tube AA. Thus, the advancement of the ends 15 and 17 toward each other along the guiding shank 26 of bolt 24 as it is engaged by the close-fitting circular portions 27 and 28 of the apertures can be resolved as motion in two directions by the diagrammatic triangles CDE and CFG. The tightening of nut 32 on shaft 33 imposes forces tending to advance plates 11 and 12 toward each other along line DG through lock washer 34 on the outer face of end section 15 and through the flange on the head of bolt 24 on the outer face of end portion 17. This causes a movement normal to the major face of the plate members 11 and 12 along a distance EF and a movement parallel to the major face of those elements a distance DE plus FG. It is this movement along the triangular legs which generates the compressive force through the inner edges 13 and 14 on the tube wall and effects the clamping operation. It is to be noted that the axis B—B of the bolt which comprises the guiding surface limiting path of movement of the end members 15 and 17 with respect to each other is inclined at an obtuse angle with respect to an extension of the plane of the faces of the plate members 11 and 12. The complement of this obtuse angle is defined by the lines CG and GF for the plate member 11 and similarly for plate member 12 by the lines CD and DE.

In order to facilitate the utilization of the clamp of this nature, it is desirable that the two cooperating clamping plates be identical in order that plates are interchangeable.. In FIG. IV this identity is illustrated by the formation of the apertures through which the bolt 24 passes identically to accommodate the head of the bolt with its adjacent square shank from either side. This is carried further as illustrated in FIGS. I and II wherein end sections 15 and 16 of plate 11 are both bent to the right when viewed from below the tubes and the end sections 17 and 18 of the plate 12 are bent to the right when viewed from above the tubes. A similar identity of plate formation can be obtained as shown in FIG. V by bending the end sections on opposite sides of a plate member in opposite directions. In FIG. V the tube is shown in phantom and section 15' of plate member 11' is bent to the right while its corresponding section 16' on the opposite side on the tube is bent to the left. Similarly, the plate section 12' is provided with end sections 17' and 18' bent in opposite directions.

When the ends 15 and 17 of the plate elements 11 and 12 are bent to an offset as illustrated in FIGS. I through IV, the opposed edges 13 and 14 separated the greatest can be mounted on the tube on the ends of a diameter thereof and as the clamp elements are tightened together, the major body portions ultimately lie in virtually common cross sections. This alignment is enhanced with the arrangement shown in FIG. V wherein the offset ends 15', 16', 17' and 18' are interfitting in opposite directions of inclination.

FIG. VI shows another embodiment of the sealing tube clamp of this invention wherein the ends of the opposed plate members are bent out of the major faces of those members. In this construction plates 61 and 62 have ends 65 and 66, only one set of end members being shown in this illustration. The guiding surfaces of this embodiment are formed by overlapping edges of protuberances 63 and 64 which are upset out of the faces of the end members 65 and 66 as is illustrated in cross section in FIG. VII. The guiding faces 68 and 69 are inclined with respect to the major faces of plate members 61 and 62 in the same manner that the bolt 24 was inclined with respect to plate members 11 and 12 as discussed in FIG. IV whereby a component of the motion of those two surfaces over each other advances the body portions of plates 61 and 62 toward each other with a component of motion in the major faces of the plates to impose a compressive force upon the embraced tube engaged by their inner edges. Where an upset is utilized, as at 63 and 64, the travel of the end members 65 and 66 toward each other will be restricted by the contact of the ends 70 and 72 of the upsets with the juxtaposed surfaces of end members 65 and 66. If contact of those juxtaposed surfaces is desired, it can be provided by forming cavities 73 and 74 in those surfaces for the reception of the opposed upsets. Those cavities can be formed in the same operation that the interlinking upsets are formed.

As in the previous examples the position of the guiding faces must be arranged to enable them to be coupled by overlapping their outer limits while the cutout region in the plates embraces an undistorted cross section of the tube. At the limits of their relative travel where the overlapping portions of the plates are most proximate, the cutout regions must be moved sufficiently to apply compressive forces on the underlying tube surfaces. Thus the guiding faces must create a component of motion along the plate faces between their limiting positions to displace the elements from the initial mounting position to the final clamping position.

Any convenient means can be utilized to draw the end members 65 and 66 together. For example, bolt holes 75 can be employed through which one or more bolts 76 can be mounted and upon which suitable tightening nuts 77 can be threaded. With this construction it is to be noted that the bolt shanks need not fit the apertures 75 closely since they function only to draw the overlapping faces toward each other, thereby facilitating their insertion and the initial mounting of the tube clamp elements.

FIG. VIII shows an embodiment of the invention wherein the guiding surface drawing the opposed plate members 81 and 82 transverse of the tube axis and toward each other is the shank of bolt 83 passing through elongated apertures 84 and 85. The limits 87 and 88 of apertures 84 and 85 are spaced from extensions of the diameter defining the limits of the semi-circular cutout portions an amount equal to one-half of the desired displacement of the elements 81 and 82 toward each other less than the radius of the bolt shank such that as the nut 86 is tightened on the bolt and the bolt is pulled down normal to the surfaces of plates 82 and 81, it imposes forces tending to shift those plates to a position offering a greater amount of overlap and imposing the compressive forces on the embraced tube.

FIG. IX illustrates the plate elements 81 and 82 in clamping position wherein the lines J—J and J'—J' define the limiting diameters of the semi-circular cutout regions for plates 81 and 82, respectively, having the edges 89 which impose the sealing pressure on the tube once it is embraced. When first mounted around the tubes, the plates 81 and 82 have their limiting diameters J—J and J'—J' superimposed as viewed along the tube axis. The tightening of bolts 85 displaced those plates toward each other until the limits 87 and 88 of the bolt receiving apertures define a cross section of the bolt, a circle in the example. The spacing between lines J—J and J'—J' indicates the relative movement of plates 81 and 82 to achieve this and thus the compression of edges 89 on the tube.

FIG. X shows another embodiment of the invention wherein the clamp plates 101 and 102 containing the conforming cutout portion which defines the edge through which the sealing pressure is imposed are drawn into overlapping relationship by the tightening of an inclined bolt 103 passing through inclined apertures 104 and 105 conforming to its shank. In order to develop the desired displacement beyond each other of the respective diameters defining the limits of the semi-circles, the centers of those apertures on the juxtaposed faces of the overlapping elements 101 and 102 are displaced toward the semi-circular cutout regions, from those diameters which extend normal to FIG. X on the points K and N. Taper washers 106 and 107 are provided on the shanks of bolt 103 to insure a proper bearing face against the outer faces of the plate elements 101 and 102 and against the under surface of bolt head 109 and the nut 110. As in the previous embodiments, as the nut is advanced along the shank of the bolt, the juxtaposed surfaces of plates 101 and 102 are drawn toward each other and those surfaces are moved longitudinally of each other to impose a force on the tube embraced by the clamping elements.

FIG. XI shows another form of pressure developing construction similar to that of FIG. VI with the exception that the ends of the plate members 111 and 112 are not displaced from the major surfaces of those elements and only the upset portions 113 and 114 are formed out of those surfaces. The position of the guiding surfaces 115 and 116 of those upset elements is such that their tips 117 and 118 are in or beyond the plane defined by the limiting diameter for the semi-circular cutout regions 111 and 112 and perpendicular to the major surfaces of those members such that they can be overlapped without imposing distorting pressure on the embraced tubes when they are initially mounted. As in the embodiment of FIG. VI, means are provided to draw the ends of the plate members 111 and 112 together, such means (not shown) can be in the form of bolts, C clamps or the like.

FIG. XII shows another form of guiding surface for drawing clamping plates 121 and 122 toward each other both normal to and along the major faces of those members. In this construction lugs 123 and 124 are secured to the clamping plates as by welding. These lugs are provided with inclined guiding surfaces 125 and 126 which can be overlapped without distorting the tube and can be suitably apertured as at 127 through both the ends of the plates and the lugs such that a bolt 128 can be passed through the apertures and tightened to draw the clamping plates toward each other and the inclined surfaces 125 and 126 across each other, thereby imposing the transverse component of motion which effects the sealing action of this invention. A perspective view of the clamping plates 121 and 122 and their cooperating lugs 123 and 124 is shown in FIG. XIII, together with the elongated aperture 127 through which the clamping bolt is mounted. As in the previous instances the limiting diameters P—P and R—R of the semi-circular edges 129 for plates 121 and 122 respectively are displaced outwardly with respect to the center of the inclined face 125 toward the end of each clamping face when viewed from that edge. When the plates are mounted on the tube those diameters fall in a common plane also containing the tube axis and as the clamp is tightened they overlap.

In recapitulation of the invention, it comprises a pair of plate-like members having cutout regions, the edges of which conform generally to the outer surface of a tube which is to be clamped with a sealing pressure. These plate members are adapted to be advanced toward each other with portions thereof in overlapping relationship along paths defined by coupling means on opposite faces of the embracing members which are in parallel planes and inclined with respect to the axis of the embraced tube. Thus, when the members have their overlapping faces drawn toward each other from an initial spaced position along the inclined guide surfaces, a component of that motion advances the plate members toward each other along a direction parallel to their major faces. This advancement advances the conforming edges bordering the cutout regions of the plates against the walls of the embraced tube and distorts the tube to create a continuous sealing line over a closed path around the tube. When the tube is telescoped around another tubular member this distortion effects a seal to that tubular member whereby a gas and liquid tight connection is created.

It is evident from the several disclosed embodiments that this invention lends itself to a number of modifications. Accordingly, the above specification is to be read as illustrative and not in a limiting sense and it is to be appreciated that modifications can be made without departing from the spirit or scope of the invention.

Having described the invention, I claim:

1. A tube clamp comprising a pair of cooperating plates arranged for mounting on opposite sides of a tube with their major faces generally normal to the tube axis, each plate having a cutout region the edge of which conforms to a portion of the outer surface of the cross section of the tube to be clamped, extensions integral with each plate and projecting beyond the region bearing said conforming edges, each extension having a major face adapted to overlap the major face of a counterpart on the opposite plate member, guiding surfaces coupled to each plate on opposite sides of said cutout region, said guiding surface of each plate being inclined with respect to a major face of said plate to define with said major face an obtuse angle when viewed from said cutout region said guiding surface of each plate being oriented to cooperate with a guiding surface of the other plate of the pair of cooperating plates when said plates are mounted on opposite sides of said tube with said edges in proximity to said tube, and means to move the juxtaposed faces of said extensions toward each other along said guiding surfaces when said cooperating plates are mounted on opposite sides of a cross section of said tube whereby a component of said movement carries the edges of said opposed cutout regions toward each other.

2. A tube clamp comprising a pair of cooperating plates arranged for mounting on opposite sides of a tube, each plate having a cutout region the edge of which conforms to a portion of the outer surface of the cross section of the tube to be clamped, extensions integral with each plate and projecting beyond the region bearing said conforming edges, guiding surfaces coupled to each plate on opposite sides of said cutout region, said guiding surface of each plate being inclined with respect to a major face of said plate to define with said major face an obtuse angle when viewed from said cutout region, said guiding surfaces being oriented to cooperate with guiding surfaces on said cooperating plate when said plates are mounted on opposite sides of said tube with said edges in proximity to said tube, and a screw threaded means for drawing said extensions toward each other along said guiding surfaces when said cooperating plates are mounted on opposite sides of a cross section of said tube.

3. A tube clamp comprising a pair of plates arranged for mounting on opposite sides of a tube, each plate having a cutout region the edge of which conforms to a portion of the outer surface of the cross section of the tube to be clamped, extensions integral with each plate and projecting beyond the region bearing said conforming edges, each of said plates having apertures on opposite sides of said cutout regions, bolts extending through the apertures of opposed plates when said plates are mounted on opposite sides of a cross section of a tube to be clamped with their extensions in overlapping relation and with the faces of overlapping extensions which are most proximate spaced apart longitudinally of said tube, said apertures being so limited and said bolts being so dimensioned in their cross section that said bolts are inclined with respect to said plates to define an obtuse angle therewith when viewed from the cutout regions when placed against the edges of said apertures most remote from the respective cutout reigons, and a nut for said bolt to advance said extensions toward each other along said bolt when it is tightened thereon.

4. A tube clamp comprising a pair of plates arranged for mounting on opposite sides of a tube, each plate having a cutout region the edge of which conforms to a portion of the outer surface of the cross section of the tube to be clamped, extensions integral with each plate and projecting beyond the region bearing said conforming edges, each extension and a portion of each plate bounding said cutout region adjacent said extension being inclined to the major faces of said plates, guiding means coupled to said extension and said portion of each plate which are inclined to the major faces of each plate at a position displaced toward the plate region containing the conforming edge from the outermost limit of the conforming edge and inclined to the major faces of said plate to which it is coupled to define an obtuse angle with the major face of said plate adjacent said edge, and means to advance said extension and said portion of one of said pair of plates which are inclined to the major faces of said one plate toward said extension and said portion of the other of said pair of plates which are inclined to the major faces of said other plate along said guiding means when said one and said other plates are mounted on opposite sides of a tube with the edge of said cut out regions of said one and other plates embracing a portion of the tube.

5. A tube clamp according to claim 4 wherein said guiding means is a bolt having its axis define said obtuse angle, said extension and said portion of each plate which are inclined to the major faces of said plate having apertures conforming to the cross section of said bolt, said apertures being located with their centers displaced from the end of the conforming edge of said cut out region toward the plate portions containing portions of said conforming edge intermediate the ends of said edge, and said advancing means is a nut on said bolt.

6. A tube clamp comprising a pair of plates arranged for mounting on opposite sides of a tube, each of said plates having a cutout region the edge of which forms a semi-circle of the same diameter as the outer diameter of the tube to be clamped, extensions on said plate projecting beyond the limiting diameter of said semi-circle and having margins generally tangent to the semi-circle at the limiting diameter of said semi-circle, the portions of said plates including extensions of the limiting diameters of said semi-circles having apertures, and a bolt extending through an aperture in each of said pair of plates when said pair of plates are mounted on opposite sides of a tube with the edges of their cut out regions embracing a portion of said tube, said bolt being adapted to draw the faces of said portions including said extensions together, said apertures being so positioned as to maintain said bolts skew of the axis of a tube when the cutout regions are mounted on opposite sides of the tube to be clamped and said portions including said extensions are spaced longitudinally of the tube whereby the drawing of said portions together along said bolt applies a component of force to said plates transverse of said tube to draw said edges of the cutout portions of said opposed plates having tangents parallel to their respective limiting diameters to a spacing less than a diameter of said clamped tube.

7. A tube clamp comprising a pair of plates adapted for mounting on opposite sides of a tube with their major faces generally parallel to each other and generally normal to the longitudinal dimensions of the tube, each of said plates having a cutout region the edge of which conforms to the perimeter of a portion of the cross section of the tube upon which they are to be mounted the edges of both cutout regions encompassing the tube perimeter when both plates are mounted in opposition on said tube, a pair of extensions on each plate extending beyond said conforming edges thereof, said extensions of both plates when said plates are mounted in opposition on said tube being located in face to face overlapping relation, a pair of guiding means coupled to each plate in the area of overlap and defining a path along which juxtaposed faces of said plates can be moved toward each other, said path forming an obtuse angle with said major faces of said plates when viewed toward the region encompassed by the opposite plate, and means to advance said juxtaposed faces of said plates toward each other along said path to reduce the region embraced by said edges to less than said cross section of the tube.

References Cited in the file of this patent

UNITED STATES PATENTS

| | | |
|---|---|---|
| 2,690,193 | Smith | Sept. 28, 1954 |
| 2,936,186 | Dunmire | May 10, 1960 |

FOREIGN PATENTS

| | | |
|---|---|---|
| 145,915 | Switzerland | July 16, 1931 |